(12) United States Patent
Fort et al.

(10) Patent No.: US 9,891,639 B2
(45) Date of Patent: Feb. 13, 2018

(54) INTEGRATED CIRCUIT POWER SUPPLY REGULATOR

(71) Applicant: STMicroelectronics (Rousset) SAS, Rousset (FR)

(72) Inventors: Jimmy Fort, Puyloubier (FR); Fabrice Marinet, Chateauneuf le Rouge (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 767 days.

(21) Appl. No.: 14/147,814

(22) Filed: Jan. 6, 2014

(65) Prior Publication Data

US 2014/0191578 A1 Jul. 10, 2014

(30) Foreign Application Priority Data

Jan. 7, 2013 (FR) ..................................... 13 50104

(51) Int. Cl.
| | | |
|---|---|---|
| H02J 1/10 | (2006.01) | |
| H02J 3/38 | (2006.01) | |
| H02J 7/34 | (2006.01) | |
| G05F 1/46 | (2006.01) | |
| G06F 1/26 | (2006.01) | |
| G06F 1/32 | (2006.01) | |
| G06F 21/75 | (2013.01) | |

(52) U.S. Cl.
CPC ................. *G05F 1/462* (2013.01); *G06F 1/26* (2013.01); *G06F 1/3237* (2013.01); *G06F 21/755* (2017.08); *Y02B 60/1221* (2013.01); *Y10T 307/549* (2015.04)

(58) Field of Classification Search
CPC ..... G05F 1/46; G05F 1/44; G05F 1/56; G05F 1/00; G01R 31/28; H02J 1/102; H02J 1/10; H02J 3/14; G06F 1/26; H02M 3/1584

USPC .......... 307/52, 110, 80, 66, 64, 43; 323/270, 323/268, 273, 278, 276; 363/65, 59, 60

See application file for complete search history.

(56) References Cited

U.S. PATENT DOCUMENTS

| | | | |
|---|---|---|---|
| 8,334,705 B1 | 12/2012 | Gunnam et al. | |
| 8,341,475 B2 * | 12/2012 | Bancel | G06F 21/52 |
| | | | 714/732 |
| 2006/0176033 A1 * | 8/2006 | Malherbe | G06K 19/073 |
| | | | 323/270 |
| 2007/0103005 A1 * | 5/2007 | Nagasawa | H02M 3/156 |
| | | | 307/125 |

(Continued)

FOREIGN PATENT DOCUMENTS

| | | | | |
|---|---|---|---|---|
| WO | WO 2004025444 A2 * | 3/2004 | ........... | G06F 21/558 |
| WO | WO-2004025444 A2 | 3/2004 | | |

OTHER PUBLICATIONS

INPI Search Report for FR1350104 dated Nov. 28, 2013 (10 pages).

(Continued)

*Primary Examiner* — Rexford Barnie
*Assistant Examiner* — Jagdeep Dhillon
(74) *Attorney, Agent, or Firm* — Gardere Wynne Sewell LLP

(57) ABSTRACT

The current signature of an electronic function is masked by controlling a current source that supplies power for the electronic function is controlled in a dynamically-varying manner. Excess current is detected and compared to a threshold. If the detected excess current meets the threshold, the operation of the electronic function is modified, for example by controlling a clock.

14 Claims, 4 Drawing Sheets

(56) References Cited

U.S. PATENT DOCUMENTS

2013/0082676 A1* 4/2013 Ivanov ................ H03F 3/3022
　　　　　　　　　　　　　　　　　　　　　　　323/316

OTHER PUBLICATIONS

Muresan R et al: "Coprocessor Architecture With Scaled Dynamic Switching Activity for Embedded Cryptosystems," Circuits and Systems, 2005, 48th Midwest Symposium, Cincinnati, Ohio Aug. 7-10, 2005, pp. 1761-1766.
Armin Krieg et al: "A Side Channel Attack Countermeasure Using System-on-Chip Power Profile Scrambling," On-Line Testing Symposium (IOLTS), 2011, 17th International, IEEE, Jul. 13, 2011, pp. 222-227.
Vahedi H et al: "Power-Smart System-on-Chip Architecture for Embedded Cryptosystems," Codes + ISSS 2005, International Conference on Hardware/Software Codesign & System Synthesis, Jersey City, NJ, Sep. 18-21, 2005, pp. 184-189.

* cited by examiner

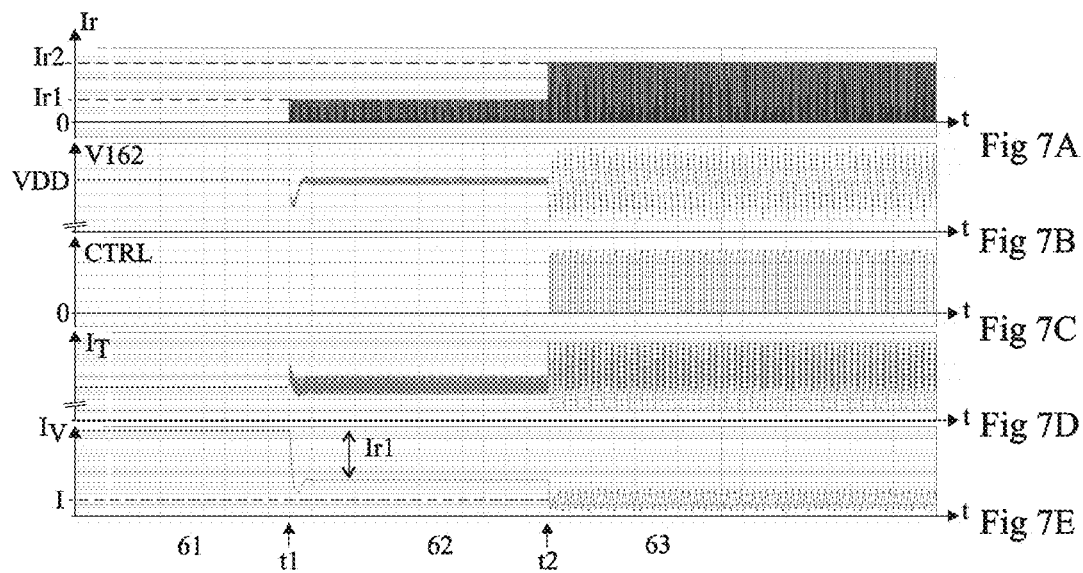
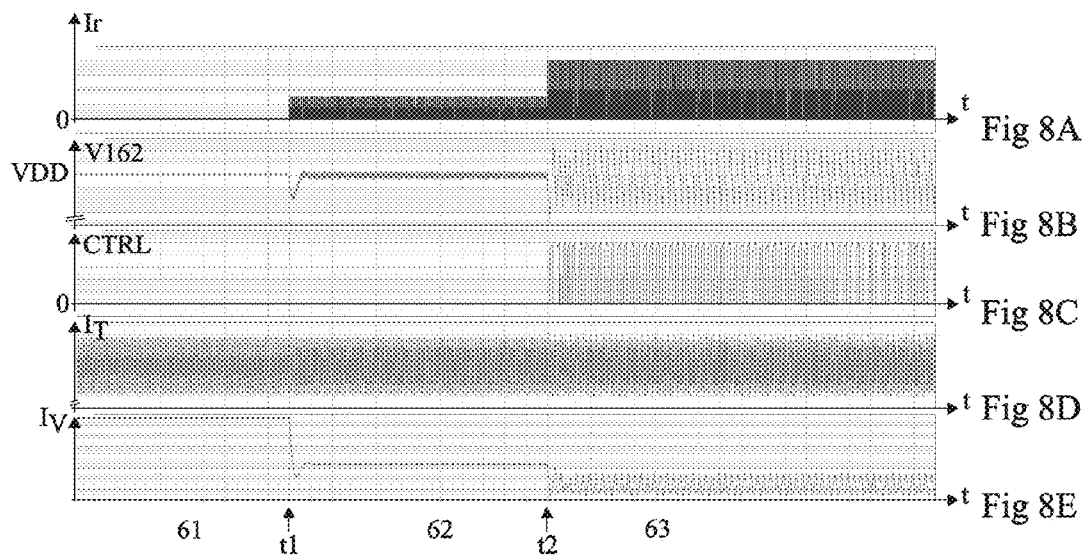

INTEGRATED CIRCUIT POWER SUPPLY REGULATOR

PRIORITY CLAIM

This application claims priority from French Application for Patent No. 1350104 filed Jan. 7, 2013, the disclosure of which is incorporated by reference.

TECHNICAL FIELD

The present disclosure generally relates to electronic circuits and, more specifically, to the power supply of such circuits. It more specifically applies to a regulator, integrated with the functional block that it powers.

BACKGROUND

Certain integrated circuits or integrated circuit functional blocks manipulate quantities (generally digital data) which are desired to be made inaccessible from the outside of the circuit, or the access to which is desired to be controlled. Such is for example the case of secret keys in cryptographic applications. The current signature of these circuits is however capable of giving information to an external observer (a hacker) implementing so-called side channel attacks.

SUMMARY

An embodiment aims at providing a solution masking the current signature of an integrated circuit or of a portion of such a circuit.

Another embodiment aims at controlling the power consumption of an integrated circuit or of a portion of such a circuit.

The present disclosure provides a method for masking the current signature of an electronic function, wherein a first current source for powering this function is controlled to provide a dynamically-varying current.

According to an embodiment, said first current source varies at a frequency of the same order of magnitude as the operating frequency of said function.

According to an embodiment, the first current source is sized to provide a constant average current, a possible current excess with respect to the needs of said function being consumed by a second current source.

According to an embodiment, a clock of said function is interrupted if the current consumed by this function exceeds a threshold.

Another embodiment provides an electronic circuit comprising a function in series with at least one first current source between two terminals of application of a power supply voltage, said first current source being controllable to provide a dynamically-varying current.

According to an embodiment of the circuit, a second current source is in parallel on said function.

According to an embodiment, the first current source is sized to provide a constant average current, a possible current excess with respect to the needs of said function being consumed by a second current source.

According to an embodiment, the current in the second source is compared with a threshold and, in the case where this threshold is reached, a signal for interrupting a clock signal of the electric function is activated.

The foregoing and other features and advantages will be discussed in detail in the following non-limiting description of specific embodiments in connection with the accompanying drawings.

BRIEF DESCRIPTION OF THE DRAWINGS

FIGS. 7A, 7B, 7C, 7D, and 7E are timing diagrams illustrating the operation of an embodiment of the regulator;
and
FIGS. 8A, 8B, 8C, 8D, and 8E are timing diagrams illustrating another embodiment of the regulator.

DETAILED DESCRIPTION OF THE DRAWINGS

Figure 1:
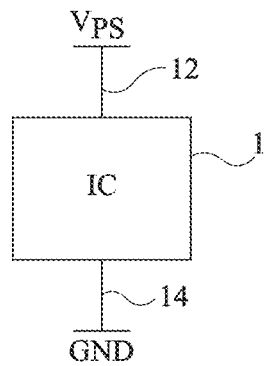
FIG. 1 shows an embodiment of an electronic circuit.

The same elements have been designated with the same reference numerals. For clarity, only those steps and elements which are useful to the understanding of the embodiments which will be described have been detailed. In particular, the function implemented by the integrated circuit(s) or circuit portion(s) powered by means of the regulator which will be described has not been detailed, the described embodiments being compatible with usual functions of such functional blocks.

FIG. 1 very schematically shows an integrated electronic circuit 1 (IC) of the type to which the present invention applies.

Such a circuit is intended to be supplied with a D.C. voltage $V_{PS}$ applied between terminals 12 (voltage $V_{PS}$) and 14 (ground GND).

The embodiments will be described hereafter in relation with this example of supply with a positive D.C. voltage. Such embodiments however transpose to other forms of D.C. power supply, for example, a negative power supply or a power supply between two positive and negative potentials.

In applications where all or part of circuit 1 manipulates data which are desired to have a controlled access from the outside (secret quantities, cryptography algorithms, etc.), it is desirable to avoid for the current signature of circuit 1, that is, the current variation sampled by this circuit from the power supply source, to enable to detect the protected data. Indeed, the integrated circuit power consumption, and thus the amount of current sampled from the power supply, depends on the task executed by the circuit and on the states of the manipulated data. This type of side-channel attacks is known as static power analysis (SPA) or differential power analysis (DPA).

Figure 2:
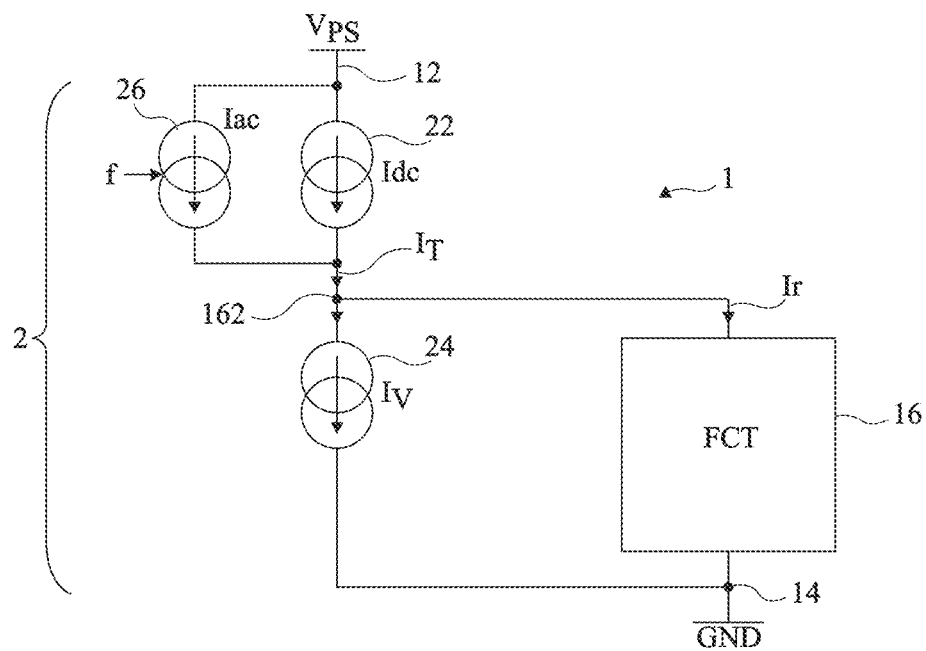
FIG. 2 is a more detailed diagram of the circuit of FIG. 1.

FIG. 2 is a simplified representation of a circuit 1 equipped with a regulator 2. This regulator is intended to power the operational functions of circuit 1, symbolized in FIG. 2 by a block 16 (FCT).

In the following description, regulator 2 is assumed to power all of circuit 1, that is, circuit 1 only integrates function 16 and regulator 2. However, the embodiments which will be described more generally apply to the power supply, by a regulator 2, of all or part of an integrated circuit, the concerned portion(s) preferably corresponding to the portions having a power consumption which is desired to be masked or controlled.

According to the embodiment of FIG. 2, it is provided to set to a constant average value $I_{dc}$ the current sampled from the power supply. A constant current source 22 is thus provided between terminal 12 and a terminal 162 for powering block 16. In order for current $I_{dc}$ to be constant independently from current $I_r$ really consumed by block 16, a variable current source 24 is provided in parallel on block 16. The function of variable current source 24 is to consume a current $I_v$ such that sum $I_T$ of currents $I_r$ and $I_v$ is constant in average.

In a simplified embodiment, current source 22 is sized according to the maximum possible power consumption of block 16 so that, whatever this consumption, current $I_{dc}$ sampled from the power supply is constant in average.

It is observed that according to the operating frequency of block 16, which most often is a logic circuit, disturbances may be visible on the current signature of circuit 1.

To mask such dynamic variations of the power consumption of block 16, embodiments functionally provide, between terminals 12 and 162, a current source 26, of value $I_{ac}$ variable at a frequency f, preferably of the same order of magnitude as the operating frequency of block 16. The current variations imposed by source 26 then mask the dynamic power consumption variations of block 16. Preferably, frequency f is itself variable, as well as the value of current $I_{ac}$.

In the present description, it is considered that the variations are dynamic if they are of the same order of magnitude as the operating clock frequency of block 16. The same order of magnitude means within a range of more or less 30% of the operating frequency of block 16.

Figure 3:
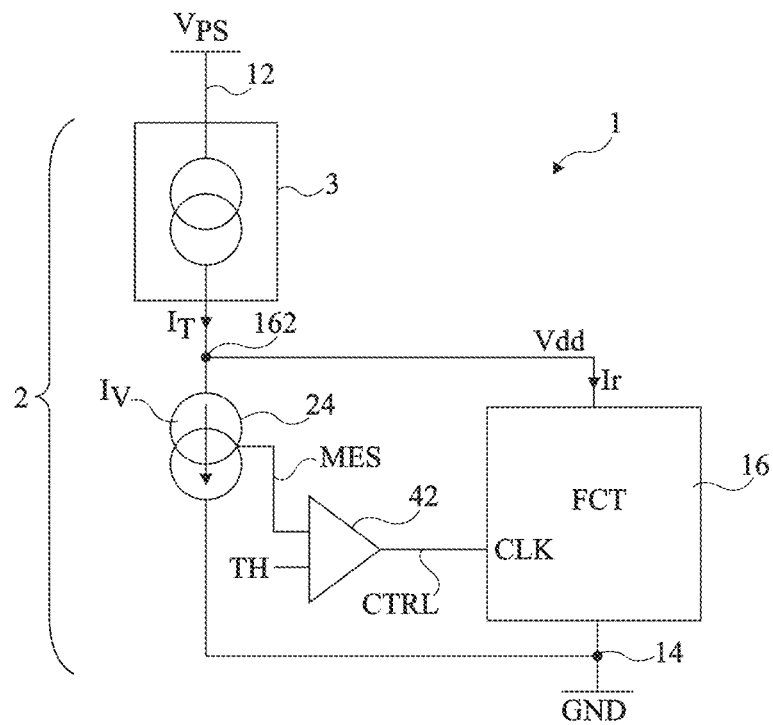
FIG. 3 shows another embodiment on the circuit of FIG. 1.

FIG. 3 is a functional block diagram of an embodiment of a circuit 1 equipped with a regulator 2. Constant and dynamic current sources 22 and 26 have been symbolized by a block 3 between terminals 12 and 162. This illustrates the fact that it may be a single current source having a value varying at frequency f around an average or nominal value selected according to the power consumption which is assigned to block 16.

In the embodiment of FIG. 3, it is further provided to control clock frequency CLK of circuit 16 to ascertain that the current capable of being provided by current source 3 is not exceeded. Indeed, this would otherwise cause a drop of the power supply voltage of block 16 which is desired to be regulated at a constant value $V_{dd}$.

Preferably, the current absorbed by bypass current source 24 is measured (signal MES) and this measurement is compared with a threshold (TH) (comparator 42). If the value absorbed by source 24 becomes too low (value MES smaller than threshold TH), comparator 42 causes a slowing down of the operation of circuit 16 (signal CTRL). This results in a decrease of current $I_r$ in circuit 16, whereby current $I_v$ deviated by source 24 is increased and comparator 42 is reversely switched. A succession of turn-on and turn-off operations of clock CLK of functional block 16 can in a way be observed. This causes a slowing down of its operation, but ascertains that the general power consumption of block 16 and of current source 24 does not exceed current $I_T$ of source 3.

Figure 4:
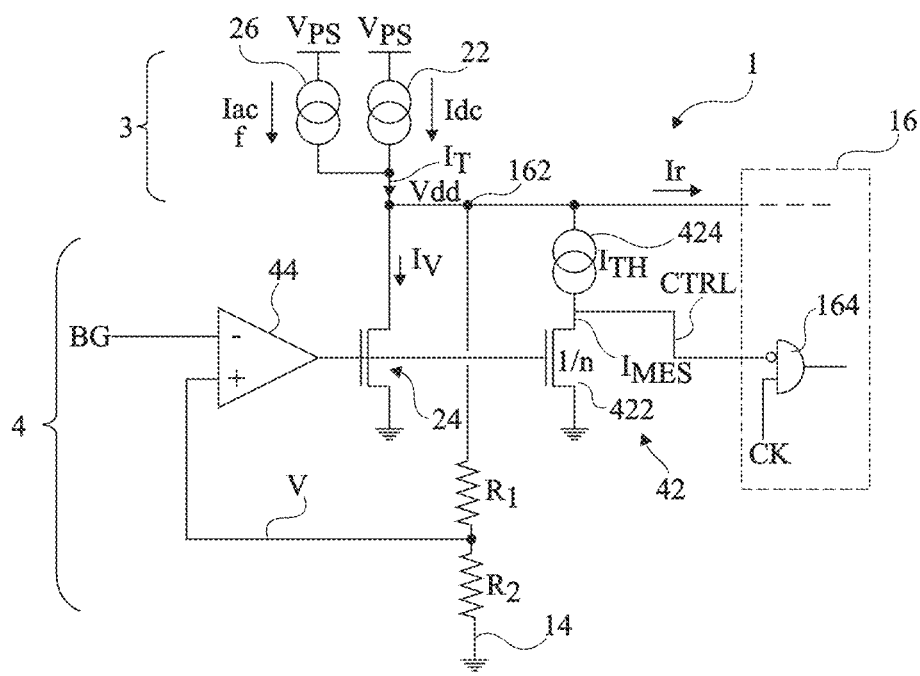
FIG. 4 shows a more detailed diagram of an embodiment of a power supply regulator, integrated with a functional block in an electronic circuit.

FIG. 4 shows an electric diagram of an embodiment of a circuit 1 having the functionalities of the embodiments discussed in relation with FIGS. 2 and 3.

It comprises the two current sources 22 and 26 setting the current sampled from power supply voltage $V_{PS}$ and providing, together, current $I_T$.

To provide an operation of block 16 at a constant power supply voltage $V_{dd}$, a voltage regulator 4 uses a reference voltage BG (for example, a so-called bandgap voltage) associated with a differential amplifier 44. A first input (for example, inverting–) of amplifier 44 receives voltage BG and a second input (for example, non inverting, +) receives data V relative to the value of voltage $V_{162}$ at node 162 (typically via a resistive dividing bridge formed of two resistors R1 and R2 in series between terminal 162 and ground 14). Amplifier 44 controls current source 24 (here, an N-channel MOS transistor connected between terminal 162 and ground 14). The variation of current $I_v$ is used to regulate the value of power supply voltage $V_{162}$ of block 16 to level $V_{dd}$ by absorbing the additional current provided by source 3 with respect to the needs of block 16.

Comparator 42 of FIG. 3 is made in the form of an N-channel MOS transistor 422, controlled by amplifier 44 (its gate is, like the gate of transistor 24, connected to the output of amplifier 44). The surface ratio (1/n) between transistors 422 and 24 enables to only sample a small portion (typically less than 1/10) of the current in source 24. Transistor 422 is in series with a constant current source 424 (typically, a P-channel MOS transistor) between terminal 162 and ground 14. The function of transistor 422 is to pull, from the branch formed of source 424 and transistor 422, a current $I_{MES}$ representative of current $I_v$ in current source 24. As long as current $I_{MES}$ remains greater than maximum current $I_{TH}$ capable of being provided by source 424, the control signal remains at a low level (logic state 0). When current $I_{MES}$ becomes lower than current $I_{TH}$, control signal CTRL switches to the high state (logic state 1), which interrupts the operation of the clock of block 16. This operation at the level of block 16 is symbolized in FIG. 4 by an AND-type logic gate 164 having a first input receiving the clock signal sent to block 16 and a second (inverted) input receiving signal CTRL. The rest of circuit 16 has not been detailed.

Figure 5:
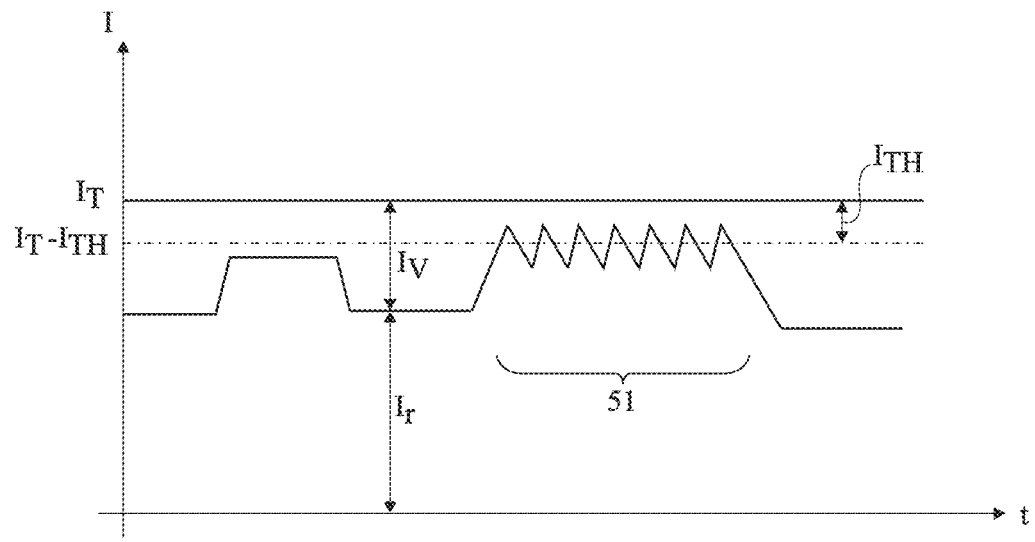
FIG. 5 is a timing diagram illustrating the operation of the regulator of FIG. 4.

FIG. 5 is a timing diagram illustrating the operation of the circuit of FIG. 4. The system is sized for a current $I_T$ corresponding to the maximum power consumption of circuit 1 as a whole. Such a maximum power consumption is either set to the worst operating case of functional block 16 of circuit 1, or set according to a power consumption desired for circuit 1 as whole.

As long as the real current $I_r$ needed by circuit 16 remains lower than threshold $I_T$–(n+1)$I_{TH}$, current source 24 samples a current $I_v$ enabling to ascertain that the sum of currents $I_r$ and $I_v$ is equal to I–$I_{TH}$. As soon as threshold I–(n+1)$I_{TH}$ has been reached by current $I_r$, the system for stopping the clock of circuit 16 starts operating (period 51 of FIG. 5) and the current becomes, in a way, chopped as long as the operation of block 16 requires a current greater than threshold $I_T$–(n+1)$I_{TH}$.

Figure 6:
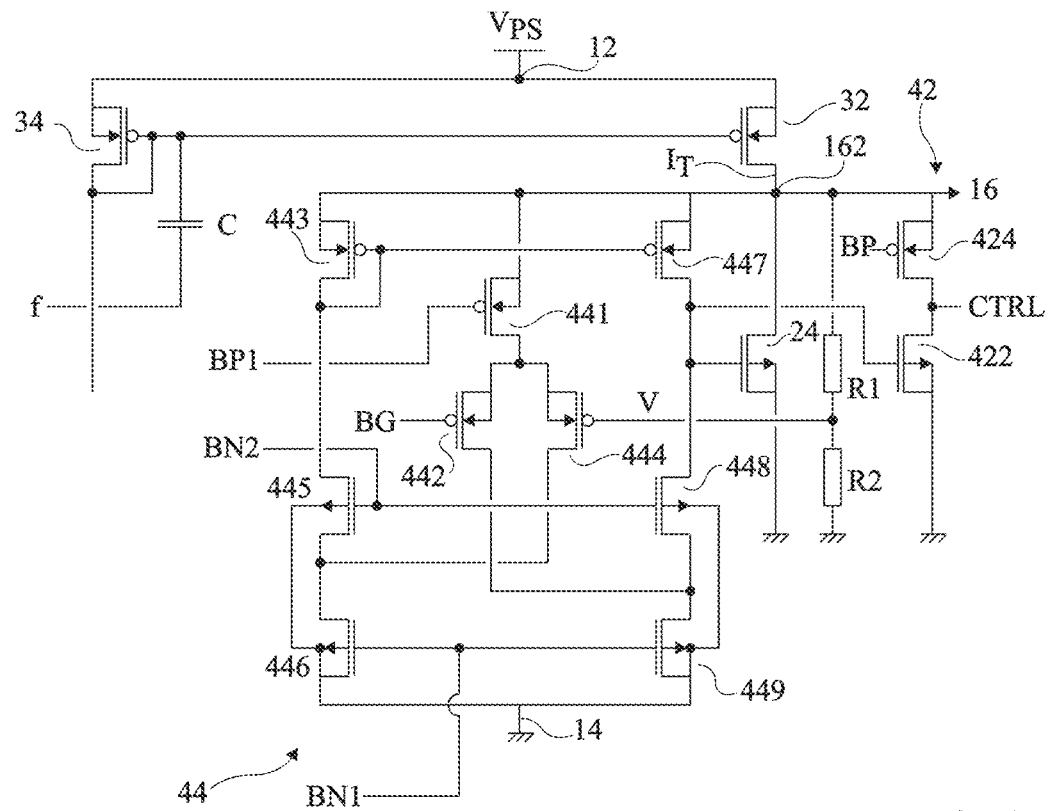
FIG. 6 is a detailed electric diagram of an embodiment of a regulator.

FIG. 6 is a detailed electric diagram of an embodiment of regulator 2 of FIG. 3. Current sources 22 and 26 (current source 3) are formed of a P-channel MOS transistor 32, assembled as a current mirror on a P-channel MOS transistor 34, having its drain receiving a bias current. Transistors 32 and 34 have their sources connected to terminal 12 and transistor 34 is diode-assembled.

To obtain a dynamic variation of current $I_T$ provided by transistor 32, having its drain connected to node 162, a capacitive element C having a first electrode connected to the common gates of transistors 32 and 34 and a second electrode receiving a signal at frequency f is provided.

Voltage regulation stage 44 is a structure usual per se, based on a differential amplifier having two P-channel input MOS transistors 442 and 444 having common sources coupled to node 162. The gate of transistor 442 receives reference level BG (bandgap). The gate of transistor 444 is connected to the midpoint of the dividing bridge formed of resistors R1 and R2. The respective drains of transistors 442 and 444 are connected to the midpoints of two branches of MOS transistors series-connected between terminal 162 and ground 14. A first branch comprises, in series, a P-channel MOS transistor 443 and two N-channel MOS transistors 445 and 446. A second branch comprises, in series, a P-channel MOS transistor 447 and two N-channel MOS transistors 448 and 449. The gates of transistors 443 and 447 are interconnected and transistor 443 is diode-assembled.

Input stage of amplifier 44 is biased by a P-channel MOS transistor 441, interposed between terminal 162 and the sources of transistors 444 and 442, transistor 441 being assembled as a current mirror with a stage BP (not detailed) for biasing the P-channel MOS transistors of the assembly. The output stage of the amplifier is biased by transistors 446 and 449, having their gates interconnected to a bias stage BN1 (not detailed). The gates of transistors 445 and 448 are interconnected to a bias stage BN2 (not detailed). The respective drains of transistors 442 and 444 are connected to the respective drains of transistors 445 and 449. The biasing of such an assembly does not need to be detailed any further. A frequency compensation of the looped system, which does not need to be detailed, may be provided.

On the side of the stage for controlling the clock of circuit 16, current source 424 is formed of a P-channel MOS transistor having its gate connected to bias stage BP of the P-channel MOS transistors of the assembly. Transistor 422 is an N-channel MOS transistor in series with transistor 424.

Although these connections are within the abilities of those skilled in the art, an example of connection of the wells of the different transistors has been shown in FIG. 6. All transistors have their well connected to their source, except for transistors 445 and 448, which have their wells directly grounded.

The operation of the circuit of FIG. 6 can be deduced from the explanations provided hereabove.

FIGS. 7A, 7B, 7C, 7D, and 7E are timing diagrams illustrating the operation of the regulator of FIG. 4, considering that current source 26 is absent, that is, that D.C. current $I_{dc}$ is not disturbed by noise at frequency f.

FIG. 7A illustrates an example of variation of current $I_r$. FIG. 7B illustrates the corresponding variation of voltage $V_{162}$ at node 162. FIG. 7C illustrates the shape of control signal CTRL for stopping the clock of circuit 16. FIG. 7D illustrates the variation of total current $I_T$ provided by current source 22. FIG. 7E illustrates the variation of the current dissipated in current source 24.

Three operating phases are assumed. In a first phase 61, circuit 16 consumes nothing (it for example is deactivated). In this case, current $I_T$ is totally collected by current source 24. At a time t1, it is assumed that circuit 16 is turned on with a first level of power consumption of average current $I_{r1}$ (FIG. 7A). This results in a decrease of current $I_r$ by an amplitude corresponding to the value of current $I_{r1}$. At the end of second phase 62 (time t2), it is assumed that the power consumption of circuit 16 has increased to a level exceeding threshold $I_{r2}=I_T-(n+1)I_{TH}$. Circuit 42 then starts operating (phase 63) and successively starts and stops the clock of circuit 16. As a result, average current $I_r$ remains at the provided acceptable level, while current $I_r$ absorbed by current source 24 remains at a level sufficient not to be canceled.

The timing diagrams of FIGS. 7A to 7E show that, while an approximately constant average current level is maintained in source 22, the operation of circuit 16 and more specifically of its clock, generates dynamic variations which reflect on total current $I_T$ and would thus be usable to deduce information relative to the data manipulated by block 16.

FIGS. 8A, 8B, 8C, 8D, and 8E are timing diagrams, to be compared with the timing diagrams of FIGS. 7A to 7E, illustrating the influence of current source 26 on the operation.

This is especially highlighted in FIG. 8D where it can be seen that total current $I_T$ is permanently dynamically disturbed by frequency signal f, that is, that the variations imposed by the clock frequency of circuit 16 have been masked. FIG. 8D further shows that the activation of block 16 is no longer detectable. The average power consumption remains at the same level set by current source 22. Similarly, the timing diagrams of FIGS. 8A, 8B, 8C, 8E remain similar to the timing diagrams of FIGS. 7A, 7B, 7C, 7E.

An advantage of the described embodiments is that it is now possible to mask the power consumption of an integrated circuit and to accordingly protect the manipulation of information that it contains.

Another advantage is that the described technique may be used to set a power consumption value for an integrated circuit and adapt its operation so that it respects this target power consumption.

Various embodiments have been described. Various alterations, modifications, and improvements will readily occur to those skilled in the art. In particular, the practical implementation of the described embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:
   regulating a supply voltage applied to an electronic function at a supply terminal of said electronic function using feedback from said supply terminal; and
   controlling a first transistor current source coupled between a power supply voltage and said supply terminal of the electronic function to provide a dynamically-varying current to said supply terminal;
   wherein regulating the supply voltage comprises controlling a second transistor current source to sink current from the supply terminal in response to said feedback from said supply terminal.

2. The method of claim 1, wherein controlling said first transistor current source comprises varying a frequency of the dynamically-varying current to have a same order of magnitude as an operating frequency of said electronic function.

3. The method of claim 1, wherein the first transistor current source includes a transistor that is sized to provide a constant average current, further comprising consuming by said second transistor current source of a possible current excess from the first transistor current source with respect to needs of said electronic function.

4. The method of claim 1, wherein said electronic function operates to manipulate data in response to an operating clock, further comprising interrupting said operating clock of said electronic function in response to a comparison of the current consumed by electronic function to a threshold.

5. An electronic circuit, comprising:
two terminals for application of a power supply voltage;
a first transistor current source;
an electronic function coupled in series at a supply terminal with the first transistor current source, the electronic function and first transistor current source series coupled between the two terminals;
a regulator circuit including a second transistor current source coupled in parallel with the electronic function and configured to control operation of the second transistor current source to regulate a voltage at the supply terminal of said electronic function using feedback from said supply terminal; and
a circuit configured to control said first transistor current source to provide a dynamically-varying current to the supply terminal of said electronic function.

6. The circuit of claim 5, wherein the first transistor current source includes a transistor that is sized to provide a constant average current, and said second transistor current source is configured to consume a possible current excess with respect to needs of said electronic function.

7. The circuit of claim 6, wherein said electronic function operates to manipulate data in response to an operating clock, further comprising a comparison circuit configured to compare current consumed by the second source with a threshold and, in the case where this threshold is reached, generate a signal for interrupting the operating clock of the electric function.

8. A method, comprising:
sourcing a first current from a power supply to a supply terminal of an electronic function using a first transistor current source, wherein said electronic function operates to manipulate data at a clock frequency and exhibits a corresponding current signature at said supply terminal;
sinking a second current to ground from the supply terminal of the electronic function using a second transistor current source;
sensing a voltage at the supply terminal of the electronic function;
controlling operation of the second transistor current source in response to the sensed voltage to control a magnitude of the second current to regulate said voltage at the supply terminal of the electronic function; and
controlling operation of the first transistor current source to dynamically vary the first current with a frequency having a same order of magnitude as said clock frequency.

9. The method of claim 8, wherein sourcing said first current comprises controlling operation of the first transistor current source to generate said first current to include a current having a constant average value and a current having variable value.

10. The method of claim 8, further comprising:
sensing the magnitude of the second current;
comparing the sensed magnitude to a threshold; and
varying the clock frequency in response to said comparing.

11. The method of claim 10, wherein varying comprises slowing down operation of said electronic function if the sensed magnitude falls below the threshold.

12. The method of claim 10, wherein varying comprises interrupting a clock of the electronic function.

13. A circuit, comprising:
an electronic circuit having a first supply terminal and a second supply terminal, said second supply terminal coupled to ground, wherein said electronic circuit operates to manipulate data at a clock frequency and exhibits a corresponding current signature at said first supply terminal;
a first transistor current source coupled between a voltage supply and the first supply terminal, said first transistor current source operating to source a first current to said first supply terminal;
a second transistor current source coupled between the first supply terminal and ground, said second transistor current source operating to sink a second current from said first supply terminal;
a first circuit configured to control operation of the first transistor current source so as to dynamically vary the first current with a frequency having a same order of magnitude as said clock frequency; and
a second circuit configured to control operation of the second transistor current source so as to control a magnitude of the second current to regulate a voltage at the first supply terminal of the electronic function.

14. The circuit of claim 13, further comprising:
a circuit operating to sense the magnitude of the second current;
a comparator circuit operating to compare the sensed magnitude to a threshold; and
a logic circuit operating to interrupt a clock of the electronic function in response to an output from said comparator circuit.

* * * * *